United States Patent [19]

Mercier

[11] 4,133,770

[45] Jan. 9, 1979

[54] SCREEN FOR A BASKET OF A CENTRIFUGAL SEPARATOR

[75] Inventor: André Mercier, La Madeleine, France

[73] Assignee: Fives-Cail Babcock, Paris, France

[21] Appl. No.: 848,079

[22] Filed: Nov. 3, 1977

[51] Int. Cl.[2] .............................................. B01D 29/10

[52] U.S. Cl. .......................... 210/497 FB; 210/360 R

[58] Field of Search ............... 210/377, 360 R, 380 R, 210/381, 382, 497 FB

[56] References Cited

U.S. PATENT DOCUMENTS

| | | | |
|---|---|---|---|
| 3,507,394 | 4/1970 | Moore | 210/380 |
| 3,552,575 | 1/1971 | Hultsch | 210/380 |

*Primary Examiner*—Frank Sever

*Attorney, Agent, or Firm*—Kurt Kelman

[57] ABSTRACT

A screen for a centrifuge basket is comprised of a frusto-conical sheet consisting of several sectors defining a multiplicity of apertures. The disposition of the apertures is the same for all screen sheet sectors. The screen sheet is divided into successive zones defined by concentric circles extending in planes parallel to the large and small bases of the frusto-conical sheet, and the apertures in the successive zones differ from each other. The apertures in the first zone adjacent the small base are round holes defining a small percentage of apertured area in the first zone. The apertures in the succeeding zones are slits inclined with respect to a generatrix of the respective sector. The angle of inclination of the slits grows from zone to zone towards the large base and all the slits in the same zone and sector have the same inclination.

1 Claim, 2 Drawing Figures

SCREEN FOR A BASKET OF A CENTRIFUGAL SEPARATOR

Figure 1:
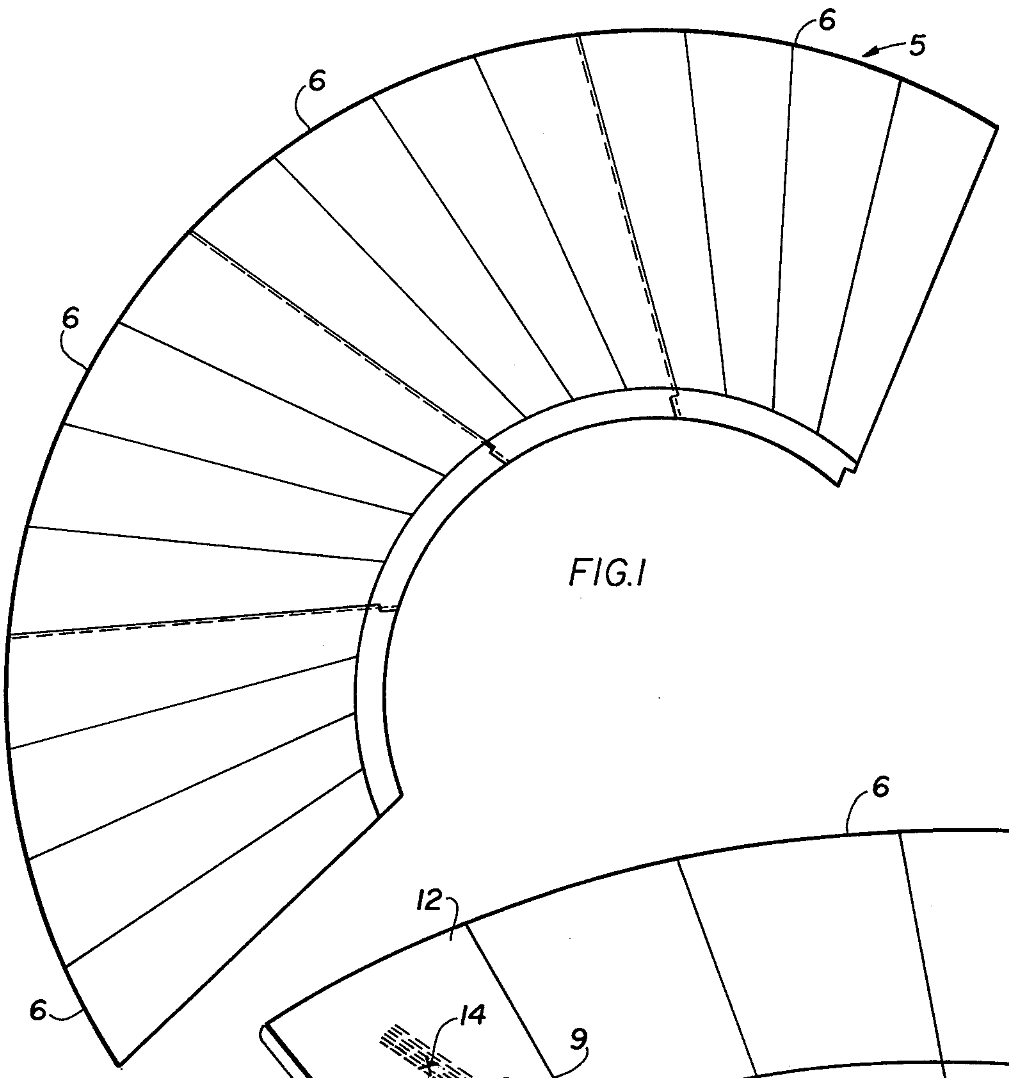

The present invention relates to improvements in screens for a basket of a centrifugal separator comprised of a frusto-conical sheet extending between a large and a small base.

A centrifugal separator incorporating a basket supporting a screen has been disclosed, for example, in U.S. Pat. No. 3,011,647. Centrifugal driers of this general type and incorporating frusto-conical baskets whose walls have a relatively small angle of inclination are used, for example, in the sugar refining industry.

The screen supported in the basket of such centrifuges is usually a sheet divided into several sectors and pierced by slits all having the same angle of inclination with respect to a median generatrix of the sector.

As soon as the liquid phase has been eliminated by the operation of such a centrifuge, to which a liquid-solids mixture has been delivered for drying, the layer of the solids in the narrow portion of the basket, i.e. near the small base, is short of the gliding limit, i.e. it is displaced under the hydrostatic pressure due to the arrival of new quantities of solids. If a deposit of solids is formed on the screen, rapidly circulating preferential flows of material are created, causing one portion of the screening surface not to be used any longer while another portion is overloaded. The quantity of dried material produced by the centrifuge is reduced and in-balances begin to appear. In the wide portion of the basket, i.e. near the large base, where the dried solids are washed, the solids glide with increasing ease and, therefore, more and more rapidly proportionally to the viscous layer which is removed therefrom, which has the effect of reducing the dwell time of the solids in the basket, thus decreasing the drying efficiency of the centrifuge.

U.S. Pat. No. 3,507,394, dated Apr. 20, 1970, discloses a wire screening basket of substantially frustoconical shape which comprises a plurality of curvilinear wires extending between opposite ends of the basket and supported by annular members. The angle which the wires make with a perpendicular line between the ends of the basket progressively increase from the smaller to the larger diameter of the basket in such a manner that the wires are substantially parallel with each other throughout their lengths.

It is the primary object of this invention to provide an apertured screen for a centrifuge basket which eliminates the indicated disadvantages of the conventional screens by improving the gliding of the solids in the narrow portion of the basket screen while impeding it in the wide washing and drying portion thereof so as to maintain a continuous layer of solids gliding over the screen at as constant a speed as possible.

This and other objects are accomplished by the invention with a screen for a basket of a centrifugal separator comprised of a frusto-conical sheet extending between a large and a small base, the frusto-conical screen sheet consisting of several sectors defining a multiplicity of apertures and the disposition of the apertures being the same for all the sectors of the screen sheet, by dividing the screen sheet into successive zones defined by concentric circles extending in planes parallel to the bases. The apertures in the successive zones differ from each other, the apertures in a first zone adjacent the small base being round holes defining a small percentage of apertured area with respect to the total area of the first zone, the apertures in the zones succeeding the first zone being slits inclined with respect to a median genetratrix of each sector of the frusto-conical screen sheet, the angle of inclination of the slits growing from zone to zone towards the large base, and all the slits in the same zone and sector having the same inclination.

The first screen zone constituting the narrow portion of the screen permits the progressive elimination of the liquid phase through the round holes defining only a small percentage of apertured area, leading to normal drying and gliding conditions.

In the successive zones, wherein the solids are washed and finally dried, the increasing angle of inclination of the slits with respect to the trajectories of the solids on the screen has the effect of eliminating the liquid phase more and more rapidly and, in view of the relatively small angle of inclination of the screen and basket walls, the friction forces are sufficiently increased to avoid rupturing the continuous layer of solids in these zones.

Figure 2:
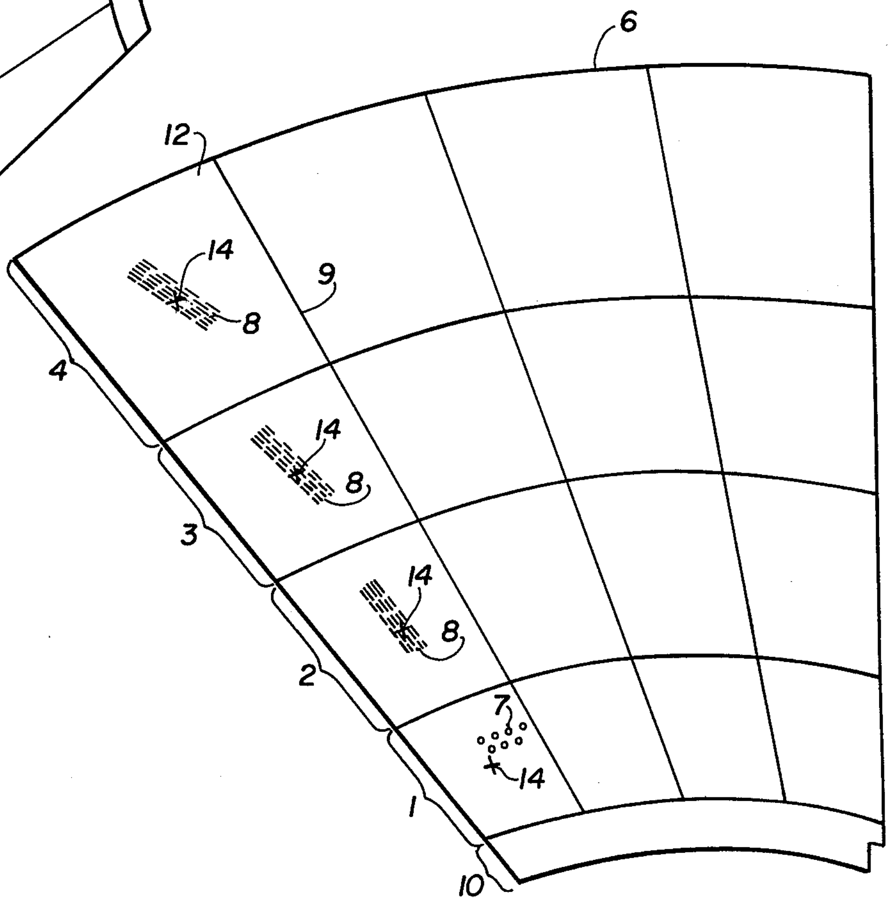

The above and other objects, advantages and features of the invention will become more apparent from the following detailed description of a now preferred embodiment thereof, taken in conjunction with the accompanying drawing wherein FIG. 1 is a developed top view of a screen sheet consisting of several sectors for a basket of a centrifugal separator and FIG. 2 is a partial view, on an enlarged scale, of the screen sheet apertured in accordance with the present invention.

As shown in FIG. 1, screen sheet 5 is formed of four sectoral screen sheet portions 6 arranged side-by-side, with the edges of adjacent sectoral sheet portions slightly overlapping each other. This four-part sheet is shaped into a frusto-conical sheet extending between a large and a small base when the two lateral outer edges are brought into overlapping relationship. All sectoral portions 6 are identical and they will be described in connection with one such portion in connection with FIG. 2.

At the small base, the sectoral portions have a narrow zone 10 which is not apertured and serves as an attachment ribbon for affixing the screen sheet to the basket in a suitable manner forming no part of the invention and well known in the art.

The screening portion of the screen sheet is divided into successive zones 1, 2, 3 and 4 defining by concentric circles extending in planes parallel to the bases. In the illustrated embodiment, each sectoral portion 6 has four sectors 12, the disposition of the apertures being the same for all the sectors of the screen sheet and being, therefore, illustrated only in connection with one sector 12. Furthermore, to simplify the drawing, only a very small number of apertures have been shown in each zone although the apertures are more or less uniformly distributed over the entire area of each zone.

As can be seen in FIG. 2, the apertures in the successive zones differ from each other. The apertures in first zone 1 adjacent the small base are round holes 7 defining only a small percentage of apertured area, i.e. the area of apertures defined by the holes is small relative to the total area of zone 1. Apertures 8 in zones 2, 3 and 4 succeeding zone 1 are slits inclined with respect to a generatrix 9 of sector 12.

To limit the variations in the inclinations of slits 8 on the periphery of the basket screen, each sectoral screen sheet portion 6 is divided into four sectors 12, each sector being divided into four fields delimited by the borders of the sector and of the zone. The angle of inclination of slits 8 is determined relative to a median generatrix of the sector passing through the center 14 of each field. In each field, the angle of inclination of the slits with respect to the median generatrix in constant, and it increases in each sector 12 progressively from zone 2 to zone 3 and from zone 3 to zone 4. In each zone, the inclination of slits 8 varies as one passes from sector to sector but the inclination is the same with respect to the median generatrix for all the fields of the same zone.

By way of example, for a frusto-conical basket whose wall has an angle of inclination of 25°, i.e. whose generatrix encloses an angle of 25° with the axis of the basket, the screen sheet has round holes of a diameter of the order of 0.2 mm and the holes cover approximately 5% of the total area of zone 1. In zone 2, the angle of inclination of slits 8 with respect to a median generatrix passing through the center of the sectoral field is 15°; in zone 3, it is 22°30'; and in zone 4, it is 30°. The lengths of zones 2, 3 and 4 are substantially identical and slightly less than that of zone 1.

What is claimed is:

1. A blank which is formed into a replaceable screen insert for a basket of a centifugal separator comprised of a frusto-conical sheet extending between a large and a small base, the frusto-conical screen sheet consisting of several sectors defining a multiplicity of apertures, the disposition of the apertures being the same for all the sectors of the screen sheet, the screen sheet being divided into successive zones defined by concentric circles extending in planes parallel to the bases, the apertures in the successive zones differing from each other, the apertures in a first one of the zones adjacent the small base being round holes defining a small percentage of apertured area with respect to the total area of the first zone, the apertures in the zones succeeding the first zone being slits inclined with respect to a median generatrix of the respective sector, the angle of inclination of the slits increasing from zone to zone towards the large base, and all the slits in the same zone and sector having the same inclination.

* * * * *